US006953400B2

(12) United States Patent
Kalies

(10) Patent No.: US 6,953,400 B2
(45) Date of Patent: Oct. 11, 2005

(54) DRIVEN PULLEY SYSTEM FOR USE IN TORQUE CONVERTER

(75) Inventor: Ken Edward Kalies, Richmond, IN (US)

(73) Assignee: Hoffco/Comet Industries, Inc., Richmond, IN (US)

( * ) Notice: Subject to any disclaimer, the term of this patent is extended or adjusted under 35 U.S.C. 154(b) by 178 days.

(21) Appl. No.: 10/438,415

(22) Filed: May 15, 2003

(65) Prior Publication Data

US 2004/0229724 A1 Nov. 18, 2004

(51) Int. Cl.[7] .......................... F16H 55/16; F16H 55/56
(52) U.S. Cl. ......................................... 472/10; 474/19
(58) Field of Search ............................. 474/19, 17, 14, 474/12, 20, 21, 37, 46, 10, 11; 192/54.52, 93 A

(56) References Cited

U.S. PATENT DOCUMENTS

| | | |
|---|---|---|
| 2,155,351 A | 4/1939 | Paulus |
| 2,612,054 A | 9/1952 | Davis |
| 2,928,286 A | 3/1960 | Davis |
| 2,987,934 A | 6/1961 | Thomas |
| 3,103,999 A | 9/1963 | Rabinow et al. |
| 3,545,580 A | 12/1970 | Baer |
| 3,625,079 A | 12/1971 | Hoff |
| 3,747,721 A | 7/1973 | Hoff |
| 3,824,867 A | 7/1974 | Brooks |
| 3,850,050 A | 11/1974 | Lemmens |
| 3,888,130 A * | 6/1975 | Blanchette .................. 474/12 |
| 4,179,946 A | 12/1979 | Kanstoroom |
| 4,196,641 A | 4/1980 | Vogel |
| 4,380,444 A | 4/1983 | Dolza |
| 4,575,363 A | 3/1986 | Burgess et al. |
| 4,585,429 A | 4/1986 | Marier |
| 4,969,856 A | 11/1990 | Miyata et al. |
| 5,254,041 A | 10/1993 | Duclo |
| 5,516,333 A * | 5/1996 | Benson ....................... 474/19 |
| 5,538,120 A * | 7/1996 | Berardicurti .............. 192/93 A |
| RE35,617 E | 9/1997 | Krivec |
| 5,720,681 A | 2/1998 | Benson |
| 5,967,286 A | 10/1999 | Hokanson et al. |
| 6,120,399 A * | 9/2000 | Okeson et al. ................ 474/14 |
| 6,149,540 A | 11/2000 | Johnson et al. |
| 6,155,940 A | 12/2000 | Templeton |
| 6,186,915 B1 | 2/2001 | Dietl |
| 6,248,035 B1 | 6/2001 | Bartlett |
| 6,336,878 B1 | 1/2002 | Ehrlich et al. |
| 6,342,024 B1 | 1/2002 | Walter et al. |
| 6,354,419 B1 | 3/2002 | Dalbiez et al. |
| 6,502,479 B1 | 1/2003 | Lee |
| 6,743,129 B1 * | 6/2004 | Younggren et al. ........... 474/19 |
| 2001/0049312 A1 | 12/2001 | Warner et al. |
| 2002/0019280 A1 | 2/2002 | Brown |
| 2002/0032088 A1 | 3/2002 | Korenjak et al. |
| 2002/0065156 A1 | 5/2002 | Younggren et al. |
| 2002/0119846 A1 | 8/2002 | Kitai et al. |
| 2002/0160867 A1 | 10/2002 | Katou |
| 2004/0142781 A1 * | 7/2004 | Huddleston .................. 474/19 |

OTHER PUBLICATIONS

Duane Watt, "Found, The Missing Half of the Secondary Clutch", *SnowTech*, Sep. 1997, pp114–119.
Three images of driven pulley system (before Jan. 17, 2003).

* cited by examiner

Primary Examiner—Marcus Charles
(74) Attorney, Agent, or Firm—Barnes & Thornburg LLP

(57) ABSTRACT

A driven pulley system for use in a torque converter of a vehicle is disclosed. The driven pulley system includes a motion-transmitting fixed unit and a belt-tensioning movable unit. The fixed unit is arranged to be fixed to a rotatable output shaft of the vehicle for rotation therewith to transmit motion between the output shaft and a belt included in the torque converter and includes a fixed flange and a cam. The belt-tensioning movable unit is arranged for movement relative to the fixed unit and includes a movable flange and a cam follower. The fixed flange and the movable flange cooperate to receive the belt therebetween for engagement therewith. The movable flange includes a rotation limiter arranged to engage the cam to limit rotation of the cam relative to the cam follower in a second direction opposite to the first direction.

24 Claims, 8 Drawing Sheets

US 6,953,400 B2

DRIVEN PULLEY SYSTEM FOR USE IN TORQUE CONVERTER

BACKGROUND

The present disclosure relates to torque converters and more particularly to driven pulley systems for use in torque converters.

Torque converters are used on vehicles to promote vehicle engine performance. A torque converter is continuously variable in response to both engine speed (i.e., engine rpm) and torque (i.e., rotational resistance) encountered by a rotatable ground-engaging element (e.g., snowmobile track, wheel) of the vehicle to promote engine performance.

A torque converter typically includes a belt trained about a driver pulley system and a driven pulley system. The driver pulley system is adjustable in response to engine speed. The driven pulley system is adjustable in response to torque. Adjustment of the driver and driven pulley systems causes adjustment of the belt trained about those systems to vary the "shift ratio" of the torque converter to allow the engine to operate at a desired engine speed.

SUMMARY

According to the present disclosure, a driven pulley system is disclosed for use in a torque converter of a vehicle. The driven pulley system comprises a motion-transmitting fixed unit and a belt-tensioning movable unit. The fixed unit is arranged to be fixed to a rotatable output shaft of the vehicle for rotation with the output shaft to transmit motion between the output shaft and a belt included in the torque converter. The movable unit is arranged for movement relative to the fixed unit to tension the belt to promote engine speed responsiveness and torque responsiveness of the torque converter.

The fixed unit includes a fixed flange and the movable unit includes a movable flange. The fixed and movable flanges cooperate to receive the belt therebetween for engagement therewith. A cam follower included in the movable unit is arranged to follow a cam included in the fixed unit to cause rotation of the movable flange relative to the fixed flange in a first direction to tension the belt upon axial movement of the movable flange away from the fixed flange.

The movable flange includes a rotation limiter. The rotation limiter is arranged to engage the cam to limit rotation of the cam relative to the cam follower in a second direction opposite to the first direction. Such relative rotation may occur, for example, when the vehicle lands on the ground after having become airborne. Impact between the ground and a rotatable ground-engaging element of the vehicle may suddenly increase the rotation rate of the element thereby jolting the cam away from the cam follower and into engagement with the rotation limiter. This situation may be referred to as "backlash."

The rotation limiter is, for example, a surface included in a channel formed in the movable flange. The cam extends into the channel and has a limiter engagement surface arranged to engage the rotation limiter upon rotation of the fixed flange in the second direction. The normal clearance between the limiter engagement surface and the rotation limiter is minimized to minimize the force of impact between the limiter engagement surface and the rotation limiter during backlash of the driven pulley system.

Additional features and advantages of the disclosure will become apparent to those skilled in the art upon consideration of the following detailed description exemplifying the best mode of the disclosure as presently perceived.

BRIEF DESCRIPTION OF THE DRAWINGS

The detailed description particularly refers to the accompanying figures in which.

DETAILED DESCRIPTION OF DRAWINGS

Figure 1:
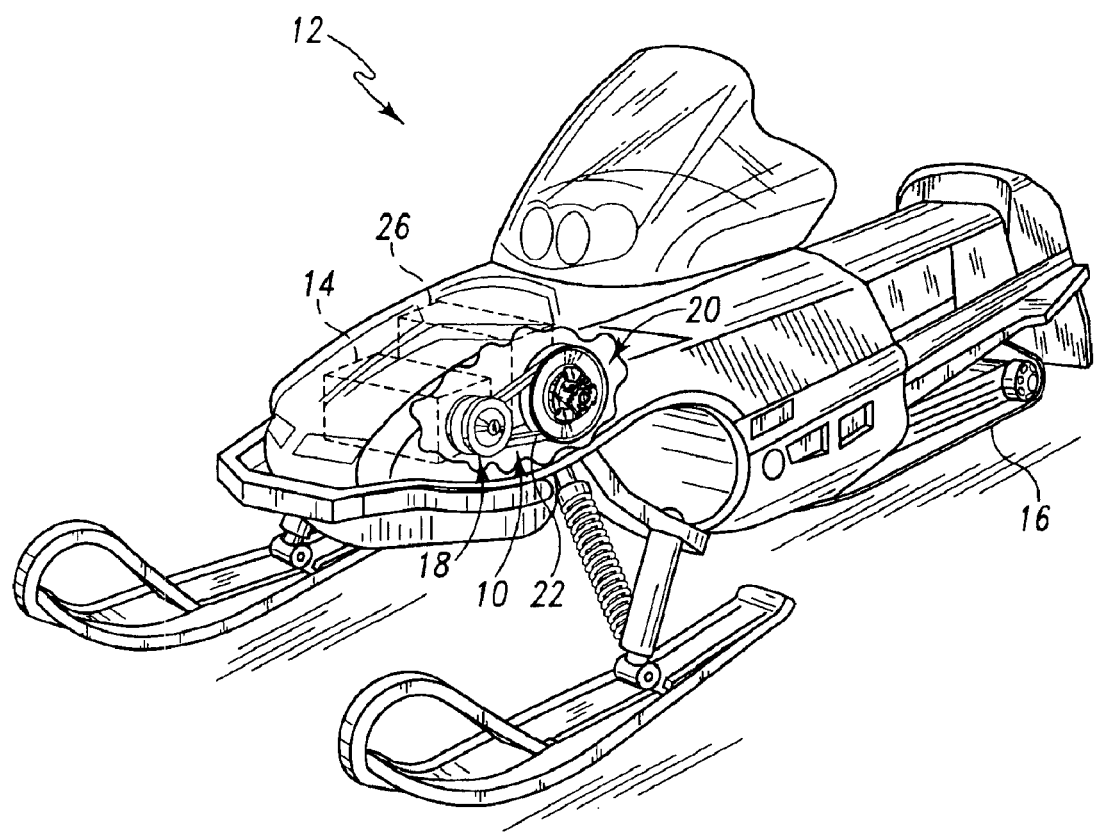
FIG. 1 is a perspective view of a snowmobile, with portions broken away, showing a torque converter of the snowmobile including a belt trained about a driver pulley system (on the left) responsive to snowmobile engine speed and a driven pulley system (on the right) responsive to torque experienced by a track of the snowmobile.

A torque converter 10 for use in a vehicle 12 is shown in FIG. 1. In the illustrated embodiment, the vehicle 12 is a snowmobile. It is within the scope of this disclosure for the torque converter 10 to be used with other types of vehicles such as utility vehicles, all-terrain vehicles, motorcycles, mini-bikes, and go-karts, to name a few.

The torque converter 10 is continuously responsive to the speed of an engine 14 of the vehicle 12 and to torque encountered by a ground-engaging element 16 (e.g., snowmobile track as in illustrated embodiment, wheel) of the vehicle 12 to allow the engine 14 to operate at a desired engine speed. For example, the torque converter 10 is arranged to "upshift" to convert increased engine speed into an increased rotation rate of the element 16 and is arranged to "downshift" to convert decreased engine speed into a decreased rotation rate of the element 16. If the element 16 encounters increased torque (such as when going uphill), the torque converter 10 downshifts to promote engine performance.

Figure 10:
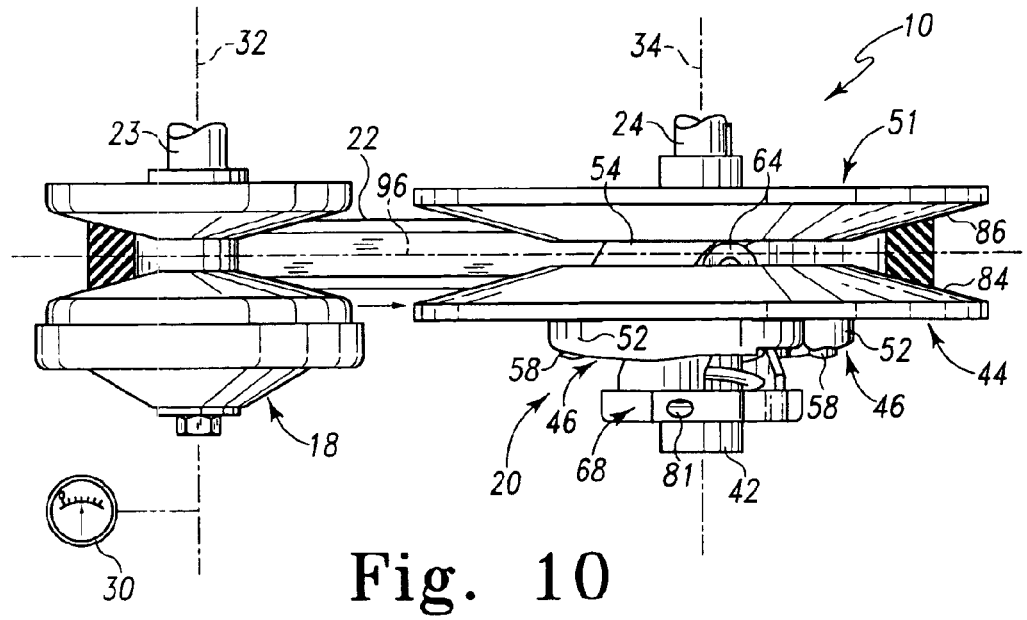
FIG. 10 is a top plan view showing the torque converter after a sudden increase in the rotation rate of the output shaft due to landing of the snowmobile on the ground.
Figure 11:
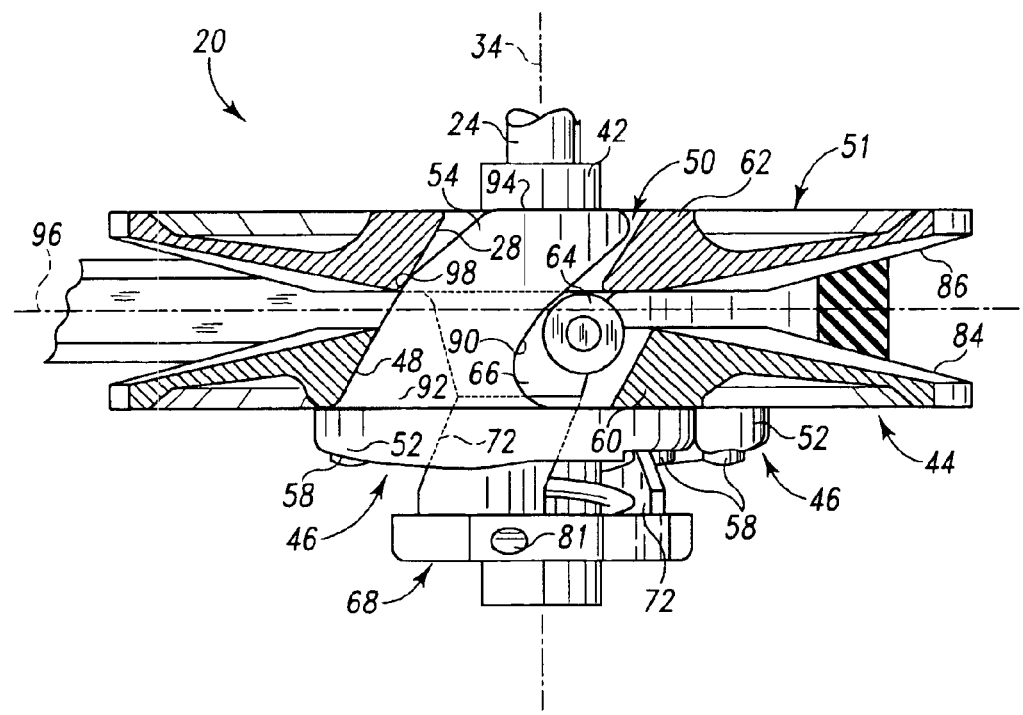
FIG. 11 is an enlarged top plan view of the driven pulley system of FIG. 10, with portions broken away, showing engagement between a limiter engagement surface of the cam and a rotation limiter included in a channel of the movable flange to limit rotation of the cam away from cam follower in the forward direction due to the sudden increase in the rotation rate of the output shaft when the snowmobile lands on the ground.

The torque converter 10 includes a driver pulley system 18, a driven pulley system 20, and a belt 22 trained about the systems 18, 20, as shown in FIG. 1. Driver pulley system 18 is coupled to an drive shaft 23 of engine 14 (see FIGS. 4, 6, and 10) for rotation therewith. An exemplary driver pulley system which may be used as system 18 is disclosed in U.S. Pat. No. 6,155,940, the disclosure of which is hereby expressly incorporated by reference herein. Driven pulley system 20 is coupled to an output shaft 24 (e.g., jackshaft) for transmission of motion between the belt 22 and the output shaft 24 and is arranged to tension the belt 22 to promote engine speed and torque responsiveness of the torque converter 10. The output shaft 24 operates a gearbox 26 for rotation of the ground-engaging element 16.

There are times when normal operation of the driven pulley system 20 may be momentarily disrupted. This may occur, for example, when the vehicle 12 lands on the ground after having become airborne, as suggested in FIGS. 8 and 9. Impact with the ground may cause relatively rotatable components of the driven pulley system 20 to rotate in an undesired manner. To limit such undesired rotation, the driven pulley system 20 includes at least one rotation limiter 28, as shown in FIGS. 3, 5, 7, 11, and 12 and discussed in more detail herein.

Systems 18, 20 are continuously adjustable in response to engine speed and torque experienced by the element 16. The belt 22 is continuously movable radially inwardly and radially outwardly on the systems 18, 20 as the systems 18, 20 adjust to engine speed and torque.

Figure 4:
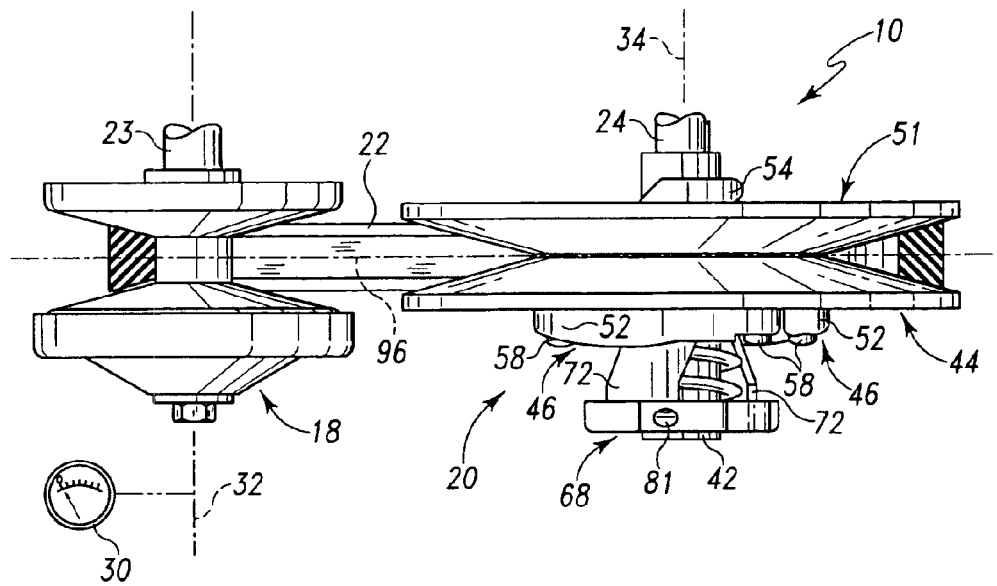
FIG. 4 is a top plan view showing the torque converter when the engine is at rest (or idling) so that the belt is positioned at a radially inner location on the driver pulley system and at a radially outer location on the driven pulley system.
Figure 6:
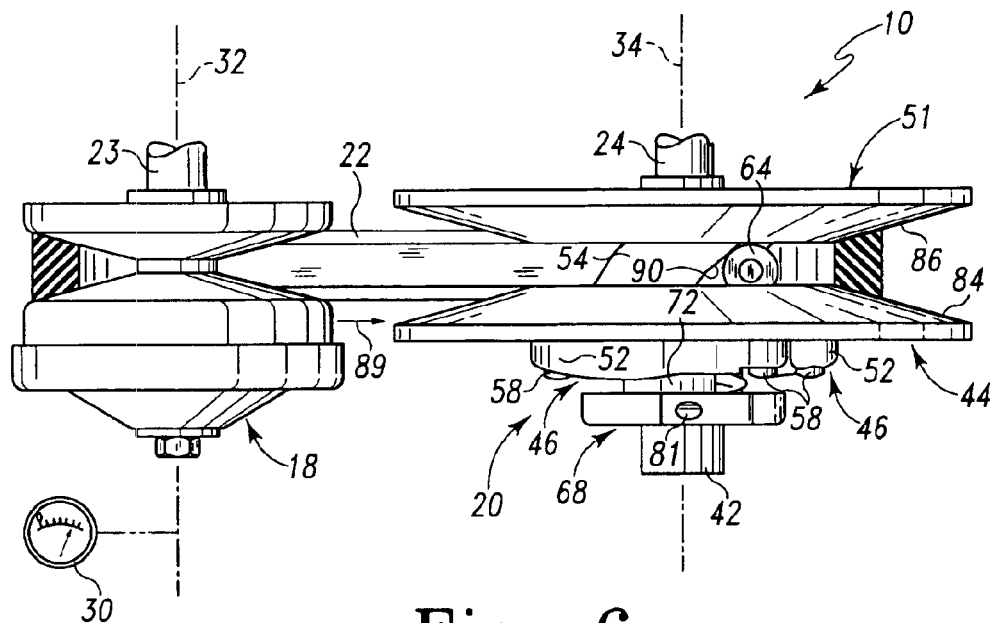
FIG. 6 is a top plan view showing the torque converter when the engine is operating above idle so that the belt rotates in a forward direction (indicated by the arrow located between the driver and driven pulley systems) and is positioned at a radially outer location on the driver pulley system and at a radially inner location on the driven pulley system.

This adjustment of systems 18, 20 and corresponding radial movement of belt 22 is shown in FIGS. 4 and 6. In FIG. 4, the engine 14 is at rest (or idling), as indicated by the speedometer 30, and the torque converter 10 is positioned in "low gear." In this configuration, the driver pulley system 18 is arranged to position the radially inwardly thereon and the driven pulley system 20 is arranged to position the radially outwardly thereon.

As engine speed increases, the torque converter 10 upshifts, as shown, for example, in FIG. 6. In particular, the driver pulley system 18 adjusts to squeeze the belt 22 radially outwardly thereon which, in turn, pulls the belt 22 radially inward on the driven pulley system 20. The driven pulley system 20 adjusts its configuration to accommodate such radial inward movement of the belt 22. When engine speed decreases or when torque on element 16 increases, the systems 18, 20 adjust for movement of the belt 22 back toward the orientation shown in FIG. 4. Directional terms used herein, such as "radial," "radially," "axial," "axially," "circumferential," "circumferentially," "rotate," "rotation," "rotatable," and the like, are relative to a driver axis 32 when used with respect to the driver pulley system 18 and to a driven axis 34 when used with respect to the driven pulley system 20.

Figure 2:
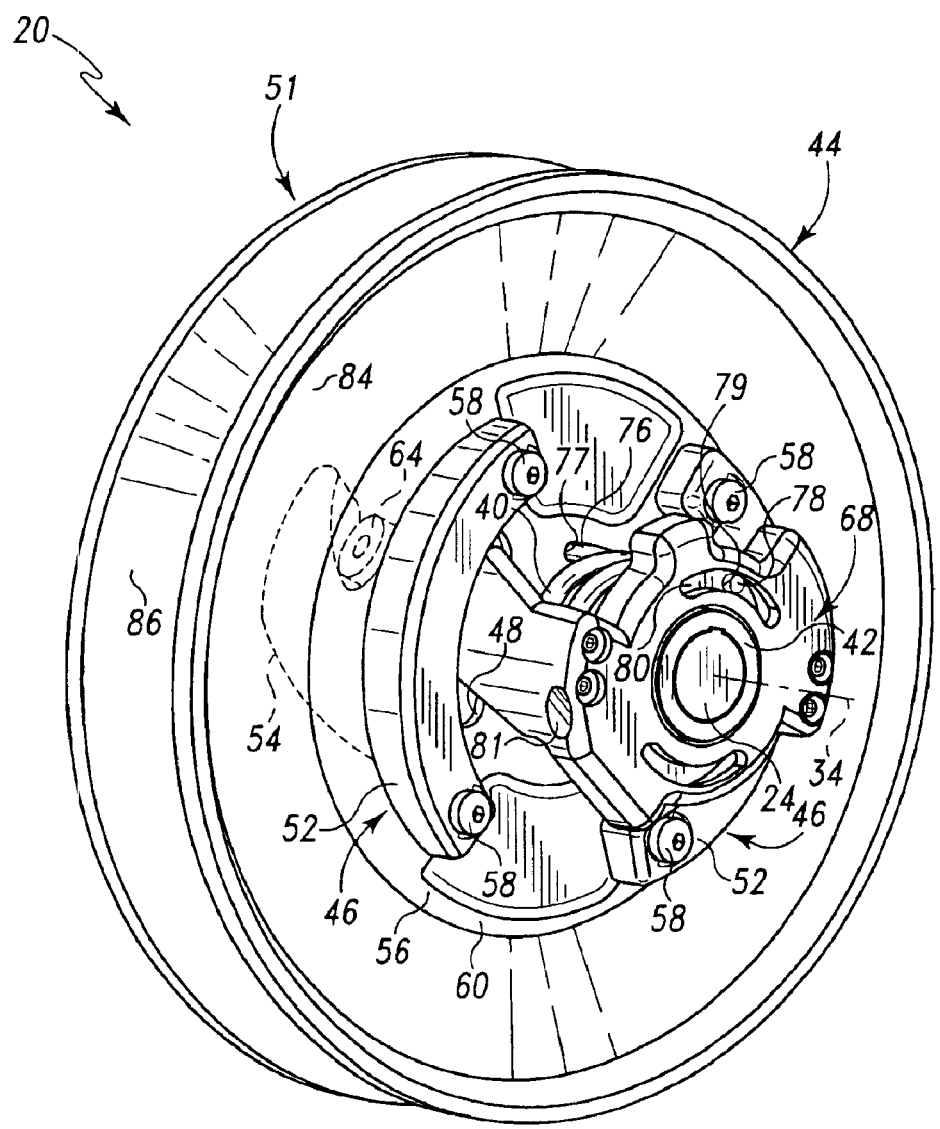
FIG. 2 is an enlarged perspective view of the driven pulley system.
Figure 3:
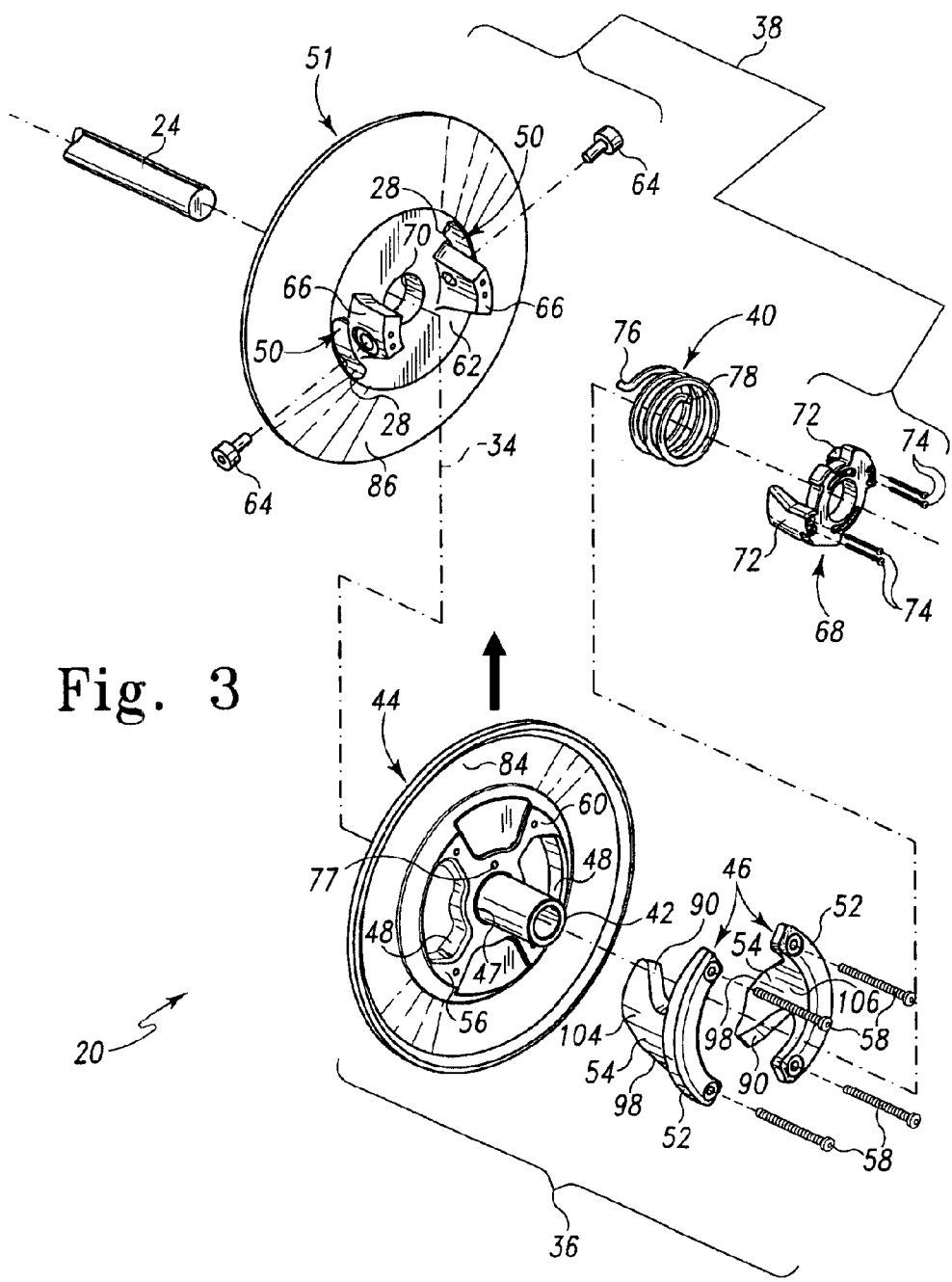
FIG. 3 is an exploded perspective view showing the driven pulley system including a motion-transmitting fixed unit (at bottom of page) to be fixed to an output shaft (at top left of page) of the snowmobile for rotation therewith to transmit motion between the output shaft and the belt of the torque converter and a belt-tensioning movable unit (at top of page) to be mounted for movement relative to the fixed unit to tension the belt during operation of the torque converter

Driven pulley system 20 includes a motion-transmitting fixed unit 36 and a belt-tensioning movable unit 38, the components of which are shown in FIG. 3. The fixed unit 36 is fixed to the output shaft 24 for rotation therewith and is arranged to transmit motion between the belt 22 and the output shaft 24. The movable unit 38 is arranged for movement relative to the fixed unit to tension the belt 22 to promote responsiveness of the torque converter 10 during operation thereof. A biasing element in the form of a coil spring 40 shown in FIG. 3 is coupled to the fixed and movable units 36, 38 to bias the system 20 to the at-rest configuration shown in FIGS. 2, 4, and 5.

Figure 5:
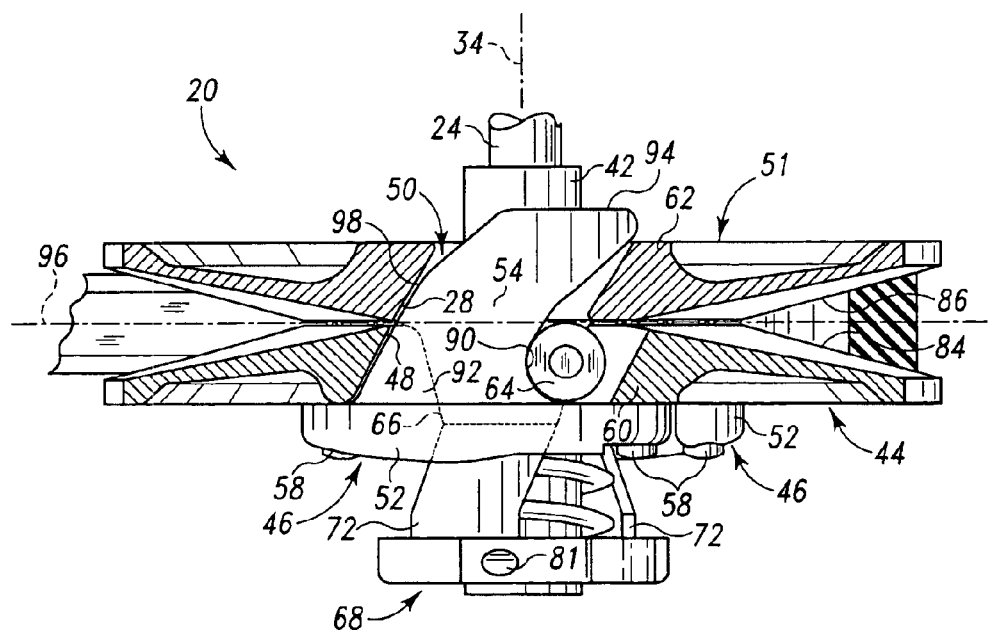
FIG. 5 is an enlarged top plan view of the driven pulley system of FIG. 4, with portions broken away, showing a cam follower of the movable unit positioned against a cam of the fixed unit.

The fixed unit 36 includes a shaft-receiving sleeve 42, an annular fixed flange 44, and a pair of cams 46, as shown, for example, in FIGS. 2, 3, and 5. The sleeve 42 is keyed to the output shaft 24 so as to be fixed thereto for rotation therewith. The sleeve 42 extends into a central hole 47 formed in the fixed flange 44. The fixed flange 44 is fixed to the sleeve 42 for rotation therewith.

Each cam 46 is mounted to the fixed flange 44 and extends through a fixed flange channel 48 formed in the fixed flange 44 into a movable flange channel 50 formed in a movable flange 5 1, as shown, for example, in FIG. 6. The cam 46 includes a cam-body mount 52 and a cam body 54. The cam-body mount 52 is removably coupled to an axially outer side 56 of the fixed flange 44 by fasteners 58. In particular, the cam-body mount 52 is coupled to a fixed flange hub portion 60. The cam body 54 is mounted to the cam-body mount 52 in monolithic relation therewith and extends axially inwardly therefrom through the fixed flange channel 48 formed in the fixed flange hub portion 60 into the movable flange channel 50 formed in a movable flange hub portion 62.

The cams 46 are spaced in a balanced manner from one another. In particular, the cams 46 are spaced diametrically apart from one another. To accommodate such cam spacing, the fixed flange channels 48 are also spaced diametrically apart from one another.

The movable unit 38 includes the movable flange 51, cam followers 64, cam-follower mounts 66, and a spring positioner 68, as shown in FIGS. 3 and 5. The sleeve 42 extends through a central hole 70 formed in the movable flange hub portion 62 such that the movable flange 51 is journalled on the sleeve 42 for rotation relative thereto. Each cam follower 64 is mounted to and extends radially outwardly from one of the cam-follower mounts 66 for engagement with a cam 46. The cam-follower mounts 64 are fixed to and spaced diametrically apart from one another on the movable flange hub portion 62 and are positioned radially inwardly from the movable flange channels 50. In the illustrated embodiment, each cam follower 64 is a roller and the cam-follower mounts 66 are towers formed monolithically with the movable flange hub portion 62.

The spring positioner 68 is mounted to the cam-follower mounts 66 for movement therewith and is arranged to position the spring 40 between the spring positioner 68 and the fixed flange 44, as shown in FIGS. 2 and 6. In particular, the spring positioner 68 includes a pair of legs 72 fixed to the cam-follower mounts 66 by fasteners 74. The legs 72 and cam-follower mounts 66 access one another through the fixed flange channels 48. The legs 72 and cam-follower mounts 66 are arranged for movement through the channels 48 as the movable unit 38 moves relative to the fixed unit 36.

The spring 40 includes fixed and movable ends 76, 78, as shown in FIG. 3. Fixed end 76 is inserted in a spring socket 77 formed in fixed flange hub portion 60 to couple the end 76 to the fixed flange 44. Movable end 78 is inserted in a spring socket 79 formed in the spring positioner 68.

The belt 22 is received in a space between the fixed and movable flanges 44, 51, as shown in FIGS. 2, 4–7, 10, and 11. The belt is a "V-belt" having a trapezoid cross-section and engages belt-engaging portions 84, 86 of the fixed and movable flanges 44, 51, respectively, which taper away from one another as they extend radially outwardly.

The spring 40 yieldably biases the movable flange 51 axially toward the fixed flange 44. The spring 40 does so via the spring positioner 68, fasteners 74, and cam-follower mounts 66. The flanges 44, 51 thus cooperate to squeeze the belt 22 to establish frictional engagement between the belt 22 and the flanges 44, 51 to promote engine speed and torque responsiveness of the torque converter 10.

The spring positioner 68 is arranged for adjusting the torsion of the spring 40 to adjust the squeeze of the belt 22 by the flanges 44, 51. The spring positioner 68 includes a worm gear 80 shown in FIG. 2 and formed to include the spring socket 79. A worm (not shown) is mounted in the spring positioner 68 to be rotated by a suitable tool (not shown) inserted in an access port 81 to rotate the worm gear 80. Rotation of the worm gear 80, in turn, winds or unwinds somewhat the spring 40 which causes the movable flange 51 to move axially relative to the fixed flange 44. Such axial movement of the movable flange 51 adjusts the belt squeeze by the flanges 44, 51.

Figure 7:
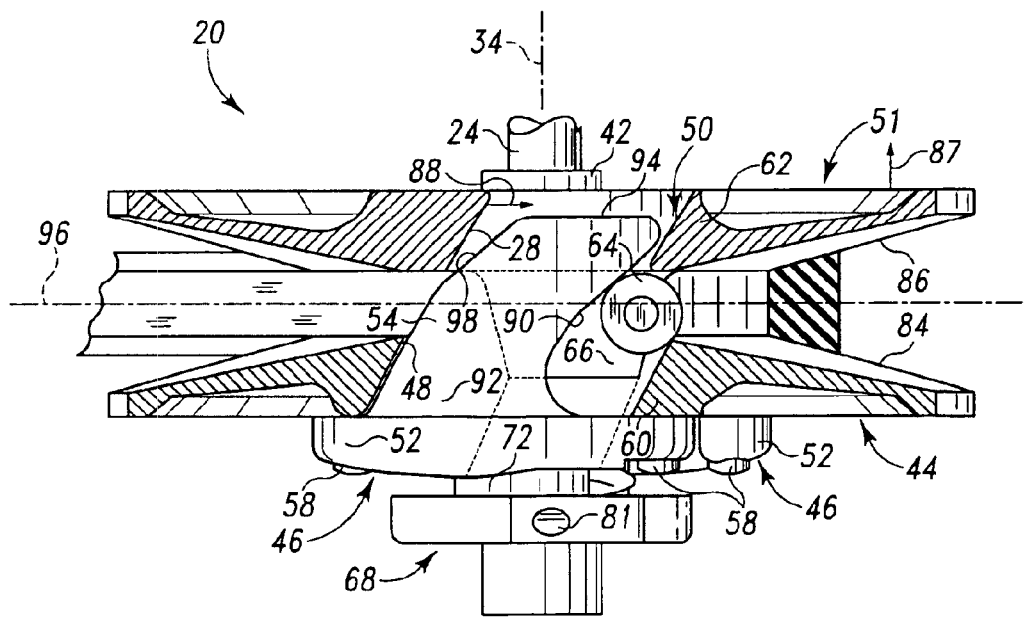
FIG. 7 is an enlarged top plan view of the driven pulley system of FIG. 8, with portions broken away, showing the belt having moved the movable flange axially away from the fixed flange thereby causing the cam follower to travel on the cam to rotate the movable flange relative to the fixed flange in a belt-tensioning, "reverse" direction opposite to the forward direction to tension the belt to promote engine speed responsiveness and torque responsiveness of the torque converter.

The movable flange 51 is movable axially inwardly away from the fixed flange 44 in direction 87 in response to radial inward movement of the belt 22 between the flanges 44, 51, as shown in FIGS. 6 and 7. The belt 22 moves radially inwardly when engine speed increases.

Axial inward movement of the movable flange 51 away from the fixed flange 44 causes the movable flange 51 to rotate relative to the fixed flange 44 about the driven axis 34, as shown in FIGS. 6 and 7. In particular, the movable flange 51 rotates relative to the fixed flange 44 in a belt-tensioning, "reverse" direction 88 which is opposite to the forward direction 89 of movement of the belt 22 and the fixed flange 44. To be clear, even the movable flange 51 continues to rotate in the forward direction 89 during such "reverse" rotation. However, in doing so, the movable flange 51 "lags behind" the fixed flange 44 so as to pull back on the belt to tension it, thereby promoting responsiveness of the torque converter 10.

The cams 46 and cam followers 64 provide such belt-tensioning rotation of the movable flange 51 relative to the fixed flange 44. Operation of one of the cams 46 and cam followers 64 is shown in FIGS. 5 and 7. It should be understood that both cam/cam follower pairs operate in the same manner so that the discussion of the operation of one pair applies to the other pair as well.

The cam follower 64 is arranged to travel back and forth on a helical follower engagement surface 90 of the cam body 54, as shown in FIGS. 5 and 7. The spring 40 yieldably biases the cam follower 64 against the follower engagement surface 90. Before activation of the driven pulley system 20, the cam follower 64 is adjacent a proximal end 92 of the cam body 54. As engine speed increases and the belt 22 moves radially inwardly between the flanges 44, 51, the cam follower 64 travels with the movable flange 51 radially inwardly away from the fixed flange 44. As it does so, it travels along the follower engagement surface 90 toward a distal end 94 of the cam body 54. Such movement of the cam follower 64 on the surface 90 causes the movable flange 51 to rotate relative to the fixed flange 44 in the belt-tensioning direction 88, thereby causing the movable flange 51 to tension the belt 22.

When the movable flange 51 rotates in this manner, it does so against a torsion biasing force from the spring 40. As such, when engine speed decreases or torque increases, the spring 40 acts to rotate the movable flange 51 relative to the fixed flange 44 in the forward direction 89. Such forward rotation of the movable flange 51 causes the cam follower 64 to move back toward the proximal end 92 of the cam body 54, thereby causing the movable flange 51 to move axially outwardly back toward the fixed flange 44.

The driven pulley system 20 is arranged so that the cam follower 64 is positioned on a plane 96 defined by a centerline of the belt 22 at start-up of the torque converter 10, as shown in FIGS. 4 and 5. Moments on the driven pulley system 20 are at their greatest at start-up of the torque converter 10. By placing the cam follower 64 on the-plane 96 defined by the centerline of the belt 22, the risk of damage to the driven pulley system 20 due to such moments is limited.

Figure 8:
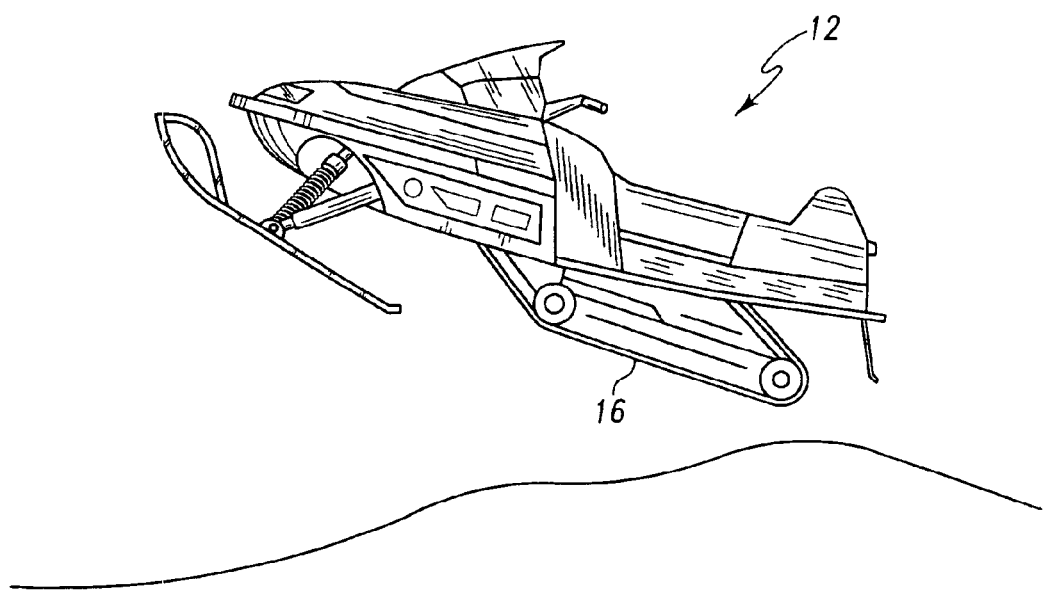
FIG. 8 is an elevation view showing the snowmobile after it has become airborne.
Figure 9:
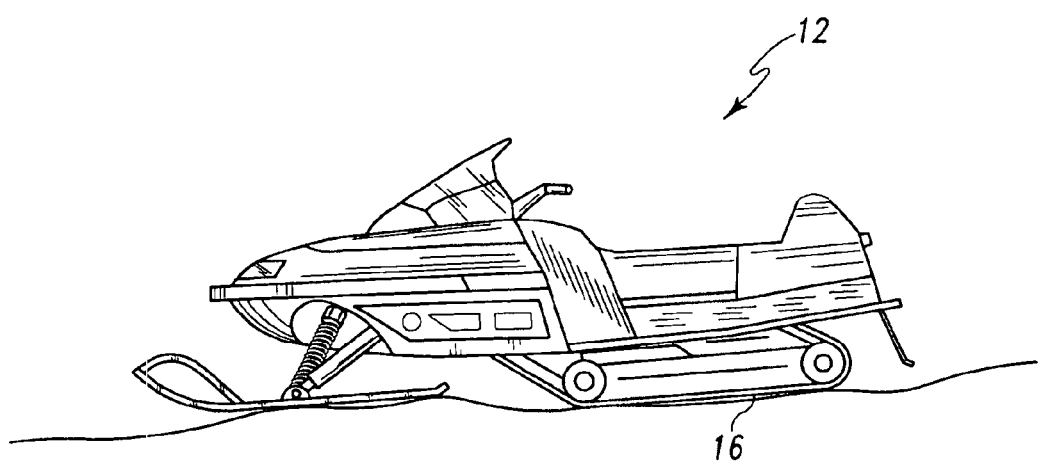
FIG. 9 is an elevation view showing the snowmobile landing on the ground after having been airborne.

The cam 46 normally remains in contact with the cam follower 64 during operation of the torque converter 10. However, in some circumstances, the cam 46 may be jolted away from the cam follower 64 in the forward direction 89. This may occur, for example, when the vehicle 12 lands on the ground after having been airborne, as shown in FIGS. 8 and 9. The impact of the vehicle 12 on the ground can suddenly increase the rotation rate of the output shaft 24 in the forward direction 89. Because the fixed unit 36 is fixed to the output shaft 24, the cam 46 is caused to rotate with the output shaft 24 in the forward direction 89 away from the cam follower 64. Such a situation may be referred to as "backlash."

Figure 12:
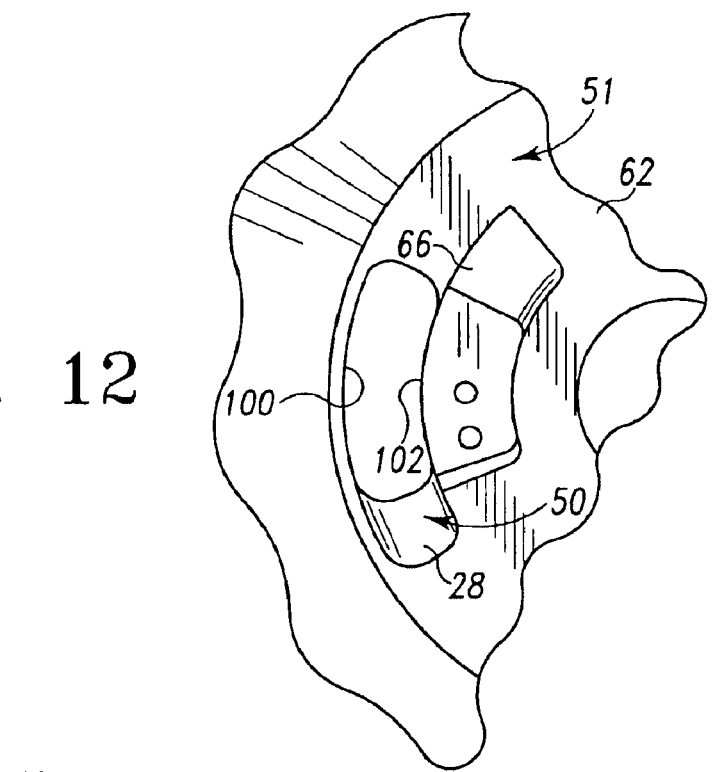
FIG. 12 is an enlarged elevation view of a portion of the movable flange showing the rotation limiter of FIG. 11 in the form of a helical surface included in the channel.

The movable flange 51 includes a rotation limiter 28 for each cam 46 to limit rotation of the cam 46 relative to the cam follower 64 in the forward direction 89 during backlash, as shown with respect to one of the rotation limiters 28 in FIG. 12. The rotation limiter 28 is a surface included in a movable flange channel 50. A limiter engagement surface 98 of the cam 46 engages the rotation limiter 28 during backlash. The duration of impact between the limiter engagement surface 98 and the rotation limiter 28 is brief. After the impact, the torsion biasing force of the spring 40 moves the follower engagement surface 90 back into engagement with the cam follower 64 for continued operation of the driven pulley system 20.

There is normally a small clearance between the limiter engagement surface 98 and the rotation limiter 28. This clearance may be, for example, about ⅛ inch. The clearance is small so that cam 46 does not travel very far away from the cam follower 64 during backlash. In this way, the force of impact between the limiter engagement surface 98 and the rotation limiter 28 is minimized to avoid damage to the driven pulley system 20.

Each of the rotation limiter 28 and the limiter engagement surface 98 is helical, as shown in FIGS. 11–14. They are helical to limit the clearance between them regardless of the position of the movable flange 51.

The rotation limiter 28 and the limiter engagement surface 98 faces toward one another, as shown in FIG. 12. The rotation limiter 28 faces axially toward the fixed flange 44 and circumferentially in the belt-tensioning direction 88. The limiter engagement surface 98 faces axially away from the fixed flange 44 and circumferentially in the forward direction 89.

Figure 13:
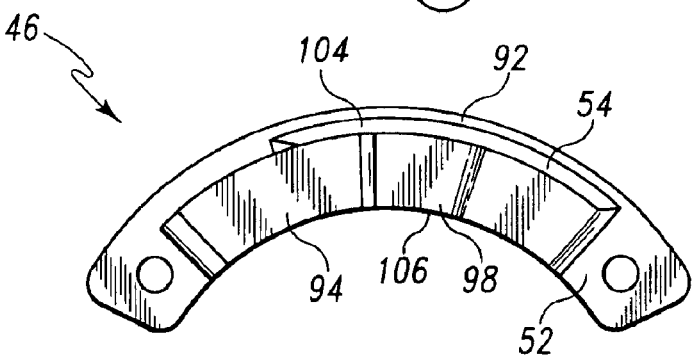
FIGS. 13 and 14 are rear elevation and side elevation views, respectively, of the cam of FIG. 12 showing that the limiter engagement surface is helical.
Figure 14:
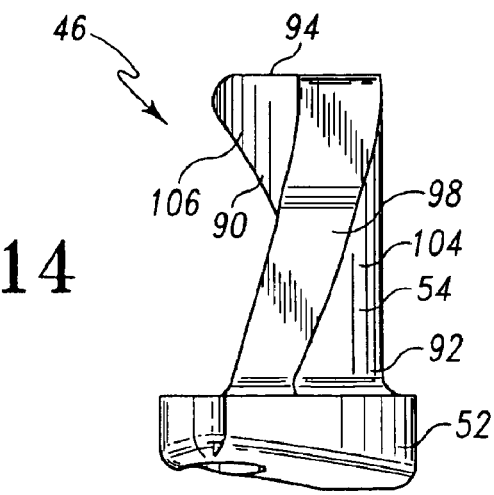

The radially inner and radially outer surfaces of the cam 46 and the movable flange channel 50 are shaped to accommodate relative movement therebetween. In particular, the channel includes a concave radially outer surface 100 and a convex radially outer surface 102 that faces the surface 100, as shown in FIG. 12. The cam 46 includes a convex radially outer surface 104 and a concave radially inner surface 106, as shown in FIGS. 13 and 14. The surfaces 104, 106 extend from the engagement limiter surface 98 to the follower engagement surface 90. The radially outer surfaces 100, 104 face one another. The radially inner surfaces 102, 106 face one another.

Each rotation limiter 28 may be referred to as rotation limiter means. As such, the rotation limiter means is arranged for engaging a cam 46 to limit rotation of the cam 46 away from a cam follower 64 in the forward direction 89 opposite to the reverse direction 88 due to rotation of the fixed flange 44 relative to the movable flange 51 in the forward direction 89 in response to an increased rotation rate of the output shaft 24 when the vehicle 12 lands on the ground after having become airborne. Stated otherwise, the rotation limiter means is arranged for limiting rotation of the fixed flange 44 relative to the movable flange 51 caused by an increased rotation rate of the output shaft 24.

What is claimed is:

1. A driven pulley system for use in a torque converter of a vehicle, the driven pulley system comprising
   a motion-transmitting fixed unit arranged to be fixed to a rotatable output shaft of the vehicle for rotation therewith to transmit motion between the output shaft and a belt included in the torque converter, the fixed unit including a fixed flange and a cam, and
   a belt-tensioning movable unit arranged for movement relative to the fixed unit, the movable unit including a movable flange and a cam follower, the fixed flange and the movable flange being arranged to receive the belt therebetween for engagement therewith, the cam follower being arranged to follow the cam to cause rotation of the movable flange relative to the fixed flange in a first direction to tension the belt upon axial movement of the movable flange away from the fixed flange due to radially inward movement of the belt, the movable flange including a rotation limiter arranged to engage the cam surface to limit rotation of the cam relative to the cam follower in a second direction opposite to the first direction.

2. The driven pulley system of claim 1, wherein the movable flange includes a channel into which the cam extends.

3. The driven pulley system of claim 2, wherein the rotation limiter is a surface included in the channel.

4. The driven pulley system of claim 3, wherein the rotation limiter is helical.

5. The driven pulley system of claim 4, wherein the rotation limiter faces axially toward the fixed flange and circumferentially in the first direction.

6. The driven pulley system of claim 5, wherein the cam includes a limiter engagement surface arranged to engage the rotation limiter and the limiter engagement surface faces axially away from the fixed flange and circumferentially in the second direction.

7. The driven pulley system of claim 2, wherein the movable flange includes an annular, radially inner hub portion and an annular, radially outer belt-engaging portion that is arranged to engage the belt and extends radially outwardly and axially from the hub portion and the channel is formed in the hub portion.

8. The driven pulley system of claim 7, wherein the movable unit includes a cam-follower mount, the cam follower is mounted to the cam-follower mount, the cam-follower mount extends axially from the hub portion, and the channel is positioned radially outwardly from the cam-follower mount.

9. The driven pulley system of claim 8, wherein the cam is mounted to the fixed flange and extends from the fixed flange into the channel, the cam includes a follower engagement surface arranged to engage the cam follower and a limiter engagement surface arranged to engage the rotation limiter, and the rotation limiter is a surface included in the channel.

10. The driven pulley system of claim 1, wherein the rotation limiter is a surface included in the movable flange, the cam includes a limiter engagement surface arranged to engage the rotation limiter, and the rotation limiter and the limiter engagement surface face one another and are helical.

11. The driven pulley system of claim 1, wherein the cam follower is arranged to be positioned on a plane defined by a centerline of the belt.

12. A driven pulley system for use in a torque converter of a vehicle, the driven pulley system comprising
    a motion-transmitting fixed unit arranged to be fixed to a rotatable output shaft of the vehicle for rotation therewith to transmit motion between the output shaft and a belt included in the torque converter, the fixed unit including a fixed flange and a cam, and
    a belt-tensioning movable unit arranged for movement relative to the fixed unit, the movable unit including a movable flange and a cam follower, the fixed flange and the movable flange being arranged to receive the belt therebetween for engagement therewith, the cam follower being arranged to follow the cam to cause rotation of the movable flange relative to the fixed flange in a first direction to tension the belt upon axial movement of the movable flange away from the fixed flange due to radially inward movement of the belt, the movable flange including rotation limiter means for engaging the cam to limit rotation of the cam away from the cam follower in a second direction opposite to the first direction due to rotation of the fixed flange relative to the movable flange in the second direction in response to an increased rotation rate of the output shaft when the vehicle lands on the ground after having become airborne.

13. The driven pulley system of claim 12, wherein the movable flange includes a channel extending therethrough, the cam extends into the channel, and the rotation limiter means is a surface included in the channel.

14. The driven pulley system of claim 13, wherein the cam includes a limiter engagement surface that faces and is arranged to engage the rotation limiter means and the rotation limiter means and the limiter engagement surface are helical.

15. The driven pulley system of claim 12, wherein the rotation limiter means is a helical surface and the cam includes a helical surface that faces and is arranged to engage the rotation limiter means.

16. A driven pulley system for use in a torque converter of a vehicle, the driven pulley system comprising a motion-transmitting fixed unit arranged to be fixed to a rotatable output shaft of the vehicle for rotation therewith to transmit motion between the output shaft and a belt included in the torque converter, the fixed unit including a fixed flange and a cam, and a belt-tensioning movable unit arranged for movement relative to the fixed unit, the movable unit including a movable flange and a cam follower, the fixed flange and the movable flange being arranged to receive the belt therebetween for engagement therewith, the cam follower being arranged to follow the cam to cause rotation of the movable flange relative to the fixed flange to tension the belt upon axial movement of the movable flange away from the fixed flange, the movable flange including a channel extending through the movable flange, the cam extending into the channel.

17. The driven pulley system of claim 16, wherein the channel includes a rotation limiter in the form of a surface of the channel arranged to engage a limiter engagement surface of the cam to limit rotation of the cam relative to the cam follower due to an increased rotation rate of the output shaft.

18. A driven pulley system for use in a torque converter of a vehicle, the driven pulley system comprising a motion-transmitting fixed unit arranged to be fixed to a rotatable output shaft of the vehicle for rotation therewith to transmit motion between the output shaft and a belt included in the torque converter, the fixed unit including a fixed flange and a cam, and a belt-tensioning movable unit arranged for movement relative to the fixed unit, the movable unit including a movable flange and a cam follower, the fixed flange and the movable flange being arranged to receive the belt therebetween for engagement therewith, the cam follower being arranged to follow the cam to cause rotation of the movable flange relative to the fixed flange to tension the belt upon axial movement of the movable flange away from the fixed flange, the movable flange including a channel extending through the movable flange, the cam extending into the channel, wherein the channel includes a rotation limiter in the form of a surface of the channel arranged to engage a limiter engagement surface of the cam to limit rotation of the cam relative to the cam follower due to an increased rotation rate of the output shaft, the channel includes a concave radially outer surface and a convex radially inner surface facing the radially outer surface, and the radially outer and radially inner surfaces extend from the rotation limiter.

19. A driven pulley system for use in a torque converter of a vehicle, the driven pulley system comprising a motion-transmitting fixed unit arranged to be fixed to a rotatable output shaft of the vehicle for rotation therewith to transmit motion between the output shaft and a belt included in the torque converter, the fixed unit including a fixed flange and a cam, and a belt-tensioning movable unit arranged for movement relative to the fixed unit, the movable unit including a movable flange and a cam follower, the fixed flange and the movable flange being arranged to receive the belt therebetween for engagement therewith, the cam follower being arranged to follow the cam to cause rotation of the movable flange relative to the fixed flange to tension the belt upon axial movement of the movable flange away from the fixed flange, the movable flange including a channel extending through the movable flange, the cam extending into the channel, wherein the channel includes a rotation limiter in the form of a surface of the channel arranged to engage a limiter engagement surface of the cam to limit rotation of the cam relative to the cam follower due to an increased rotation rate of the output shaft, the cam includes a follower engagement surface arranged to engage the cam follower, a convex radially outer surface, and a concave radially inner surface, and the radially outer and radially inner surfaces extend between the follower engagement surface and the limiter engagement surface.

20. A driven pulley system for use in a torque converter of a vehicle, the driven pulley system comprising a motion-transmitting fixed unit arranged to be fixed to a rotatable output shaft of the vehicle for rotation therewith to transmit motion between the output shaft and a belt included in the torque converter, the fixed unit including a fixed flange and a cam, and a belt-tensioning movable unit arranged for movement relative to the fixed unit, the movable unit including a movable flange and a cam follower, the fixed flange and the movable flange being arranged to receive the belt therebetween for engagement therewith, the cam follower being arranged to follow the cam to cause rotation of the movable flange relative to the fixed flange to tension the belt upon axial movement of the movable flange away from the fixed flange, the movable flange including a channel extending through the movable flange, the cam extending into the channel, wherein the channel includes a rotation limiter in the form of a surface of the channel arranged to engage a limiter engagement surface of the cam to limit rotation of the cam relative to the cam follower due to an increased rotation rate of the output shaft and the rotation limiter and the limiter engagement surface are helical.

21. A driven pulley system for use in a torque converter of a vehicle, the driven pulley system comprising a motion-transmitting fixed unit arranged to be fixed to a rotatable output shaft of the vehicle for rotation therewith to transmit motion between the output shaft and a belt included in the torque converter, the fixed unit including a fixed flange and a cam, and a belt-tensioning movable unit arranged for movement relative to the fixed unit, the movable unit including a movable flange and a cam follower, the fixed flange and the movable flange being arranged to receive the belt therebetween for engagement therewith, the cam follower being arranged to follow the cam to cause rotation of the movable flange relative to the fixed flange to tension the belt upon axial movement of the movable flange away from the fixed flange, the movable flange including a channel, the cam extending into the channel, wherein the movable unit includes a tower positioned radially inwardly from the channel and extending axially toward the fixed flange and the cam is a roller mounted to and extending radially outwardly from the tower.

22. A driven pulley system for use in a torque converter of a vehicle, the driven pulley system comprising a fixed flange arranged to be mounted in fixed relation to a rotatable output shaft of the vehicle for rotation therewith, and a movable flange arranged for movement relative to the fixed flange, the fixed and movable flanges being arranged to receive a belt of the torque converter therebetween for engagement therewith, the movable flange including rotation limiter means for limiting rotation of the fixed flange relative to the movable flange caused by an increased rotation rate of the output shaft and a plurality of positions regardless of the position of the movable flange.

23. The driven pulley system of claim 22, wherein the movable flange includes a channel and the rotation limiter means is a surface included in the channel.

24. The driven pulley system of claim 23, further comprising a cam arranged to extend into the channel and to rotate into engagement with the rotation limiter means in response to the increased rotation rate of the output shaft.

* * * * *